United States Patent [19]

Washizuka

[11] Patent Number: 4,597,056
[45] Date of Patent: Jun. 24, 1986

[54] LANGUAGE TRANSLATOR HAVING CIRCUITRY FOR RETRIEVING FULL WORDS AFTER SINGLE LETTER INPUT

[75] Inventor: Isamu Washizuka, Soraku, Japan

[73] Assignee: Sharp Kabushiki Kaisha, Osaka, Japan

[21] Appl. No.: 436,932

[22] Filed: Oct. 27, 1982

[30] Foreign Application Priority Data

| Oct. 30, 1981 | [JP] | Japan | 56-175096 |
| Oct. 30, 1981 | [JP] | Japan | 56-175097 |
| Oct. 30, 1981 | [JP] | Japan | 56-175098 |

[51] Int. Cl.⁴ .......................... G06F 15/38; G06F 3/02
[52] U.S. Cl. ..................................... 364/900; 364/419
[58] Field of Search ... 364/200 MS File, 900 MS File, 364/419, 709; 434/157

[56] References Cited

U.S. PATENT DOCUMENTS

| 4,218,760 | 8/1980 | Levy | 364/900 |
| 4,366,551 | 12/1982 | Holtz | 364/900 |
| 4,438,505 | 3/1984 | Yanagiuchi | 364/900 |
| 4,464,731 | 8/1984 | Nishimura | 364/900 |
| 4,468,754 | 8/1984 | Asada | 364/900 |
| 4,481,508 | 11/1984 | Kamei et al. | 340/712 |
| 4,481,607 | 11/1984 | Kobayashi et al. | 364/900 |
| 4,482,981 | 11/1984 | Morimoto et al. | 364/900 |
| 4,498,149 | 2/1985 | Yoshida | 364/900 |
| 4,503,426 | 3/1985 | Mikulski | 340/711 |
| 4,541,069 | 9/1985 | Kanou et al. | 364/900 |

Primary Examiner—Raulfe B. Zache
Assistant Examiner—A. E. Williams, Jr.
Attorney, Agent, or Firm—Birch, Stewart, Kolasch & Birch

[57] ABSTRACT

An input device, for enabling a first word represented in a first language is adapted for an electronic translator for obtaining a second word represented in a second language, equivalent to the first word, in response to the input of the first word. The input device includes a specifying circuit for specifying a letter, an input circuit for controlling the specifying circuit to input the letter into the electronic translator to at least partially define the first word, a memory for memorizing a plurality of words containing the first letter, an access circuit provided for addressing the memory to retrieve the words, and a display responsive to the access circuit for displaying the words. The access circuit is operated in response to the operation of the input circuit so that the memory develops words starting with the input letter. The specifying circuit is further operated, after the first word is selected, so that the memory develops additional words in either an alphabetical order or a reverse order in the first language.

7 Claims, 11 Drawing Figures

FIG. 2 (1) 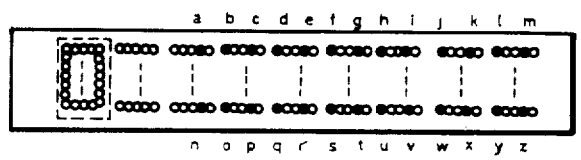
FIG. 2 (2) 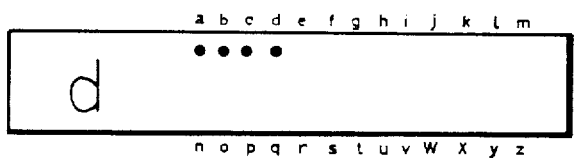
FIG. 2 (3) 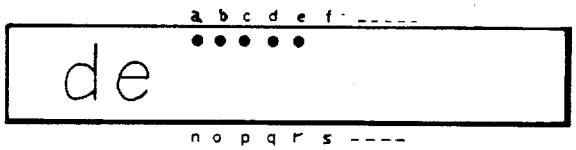
FIG. 3 (1) 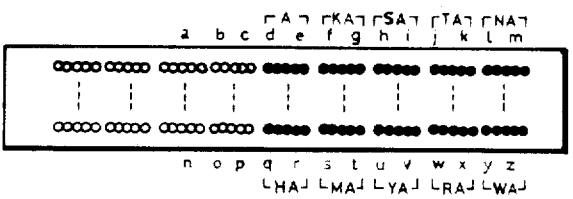
FIG. 3 (2) 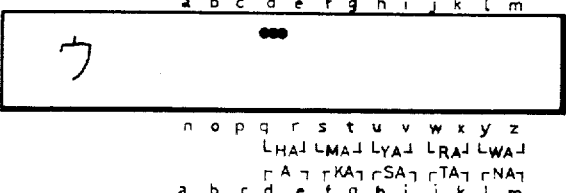
FIG. 3 (3) 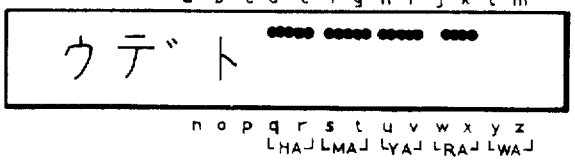

FIG.4

| | Key Switch | Display |
|---|---|---|
| (1) | ▶ | a |
| (2) | ▶ | b |
| (3) | ↓ | ba |
| (4) | ↓ | bc |
| (5) | ↓ | bo |
| (6) | | body |
| (7) | ◀ | boat |
| (8) | TR | ボート , フネ |

LANGUAGE TRANSLATOR HAVING CIRCUITRY FOR RETRIEVING FULL WORDS AFTER SINGLE LETTER INPUT

BACKGROUND OF THE INVENTION

The present invention relates to an information retrieval system and, more particularly, to a word information retrieval system adapted to output words (translated words) by specifying entry words in an electronic apparatus such as a translator.

Recently, electronic devices called electronic translators have become available on the market. The electronic translators require efficient and rapid retrieval of word information stored in a memory.

Conventionally, to specify the entry words, it is required to actuate a plurality of key switches. Therefore, it is desirable to reduce the number of the key switches to be actuated in specifying the entry words.

SUMMARY OF THE INVENTION

Accordingly, it is an object of the present invention to provide an improved electronic translator for enabling rapid input of word information into the translator.

It is another object of the present invention to provide an improved electronic translator for inputting word information to be retrieved from a memory with few operations of input key means.

It is a further object of the present invention to provide an improved electronic translator for retrieving word information from a memory with an entry word search key.

It is a still further object of the present invention to provide an improved electronic translator for providing an analog display to show a present word search operation.

Briefly described, in accordance with the present invention, an input device for enabling a first word represented in a first language, the input device being adapted for an electronic translator for obtaining a second word represented in a second language, equivalent to the first word, in response to the input of the first word, comprises specifying means for specifying an alphabetical letter; input means for controlling the specifying means to input said one of the letters into the electronic translator to define the first word, memory means for memorizing a plurality of words containing the first word, access means provided for addressing the memory means to retrieve the first word, and display means responsive to the access means for displaying the first word.

The access means is operated in response to the operation of the input means so that the memory means develops words starting with said one of the letters. The specifying means is further operated, after the first word is selected, so that the memory means develops the words in either an alphabetical order or a reverse order in the first language.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 2(1) to 2(3) and 3(1) to 3(3) show display contents in a letter search or an entry word search operation;

FIG. 4 shows the relation between key switches operated and display contents;

DESCRIPTION OF THE INVENTION

First of all, any languages can be applied to a pocket electronic translator of the present invention. Original words are spelled in a specific language to obtain equivalent words, or translated words spelled in a different language corresponding thereto. The languages can be freely selected. According to an example of the present invention, it is assumed that the input language is English and the translated lanugage is Japanese. In addition, the electronic translator can operate as a conventional electronic calculator.

Figures 1, 5:
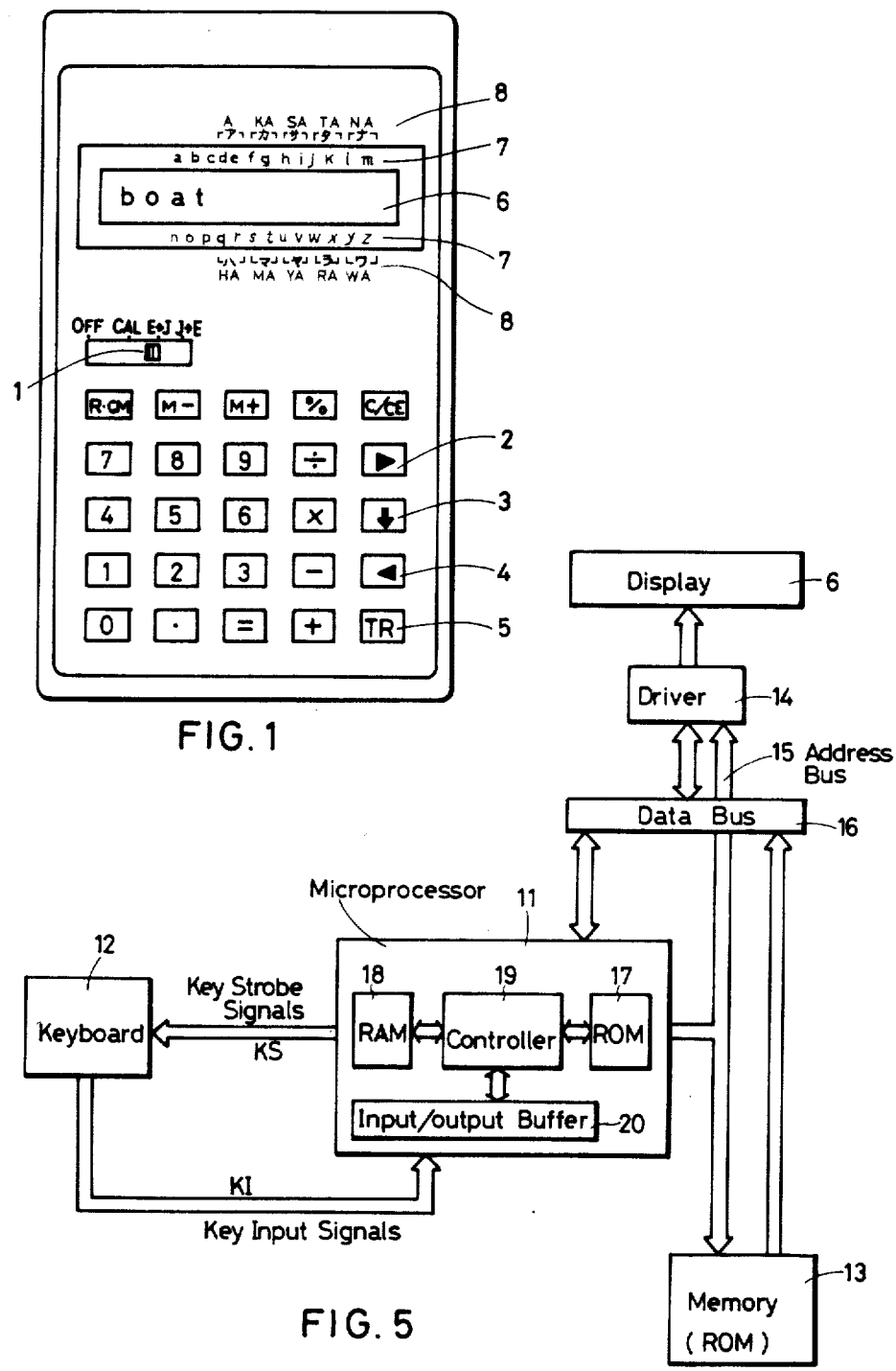
FIG. 1 shows a plan view of a pocket electronic translator according to the present invention.
FIG. 5 shows a block diagram of a circuit implemented within the translator as shown in FIG. 1.

FIG. 1 shows the electronic translator according to the present invention. The translator comprises a mode selector 1, a letter forward search key 2, a letter input and entry word forward search key 3, a letter backward search and entry word backward search key 4, a translation key 5, a display 6, a-z indexes 7 and Japanese syllabary indexes 8.

Other key switches except the above key switches are actuated to enable the conventional electronic calculator.

The mode selector 1 is positioned to select one of a power off mode, a calculator mode, an English to Japanese translation mode, and a Japanese to English translation mode. The position of the English to Japanese translation mode is shown as "E→J" in FIG. 1. The position of the Japanese to English translation mode is shown as "J→E" in FIG. 1.

In the English to Japanese translation mode, each time the letter forward search key 2 is actuated, each of the English letters is displayed in the display 6 in the English alphabetical order. In the Japanese to English translation mode, each time the letter forward search key 2 is actuated, each of the Japanese "katakana"s is displayed in the display 6 in the Japanese alphabetical order.

In the English to Japanese translation mode, the letter input and entry word forward search key 3 is actuated to input a specific English letter or plurality of letters and to then retrieve English words starting with the specific letter(s) in the English alphabetical order (forward order) from a memory, and subsequently display it (them) in the display 6. The specific English alphabet(s) is specified by operating the letter forward search key 2. In the Japanese to English translation mode, the letter input and entry word forward search key 3 is actuated to input a specific Japanese "katakana" or "katakanas" and to then retrieve Japanese words starting with the specific Japanese "katakana(s)" in the Japanese alphabetical order (forward order) from the memory, subsequently and display it(them) in the display 6. The specific Japanese "katakana(s)" is also specified by operating the letter forward search key 2 or the letter backward search key 4.

Before the letter input and entry word forward search key 3 is operated, the letter backward search and entry word backward search key 4 is operated to enable letters to be searched in a reverse direction of the alphabetical order, or a backward direction. After the letter input and entry word forward search key 3 is operated, the letter backward search and entry word backward search key 4 is operated to enable entry words to be searched in the backward direction.

The translation key 5 is operated to enable translation. After the entry word forward search key 3 or the entry word backward key 4 is operated to specify a specific English word (or a Japanese word), the translation key 5 is actuated to output and display a Japanese word (or an English word) equivalent to the specific English word (or the Japanese word).

The display 6 is provided. The a–z indexes 7 and the Japanese syllabary indexes 8 are printed around the display 6. The a–z indexes 7 contain the letters a to z. The Japanese syllabary indexes 8 contain some Japanese "katakanas" each leading each of columns of the Japanese syllabary. The indexes 7 and 8 are provided to display a letter search or an entry word search operation as an analog display.

FIGS. 2(1) to 2(3) and 3(1) to 3(3) show display examples in the display 6 representing the search operations. The indexes 7 and 8 are used as related to the display examples. The display 6 includes 9-digit symbols. Each of symbols is formed as a dot matrix.

FIG. 2(1) shows the matrices of the dots used in displaying the letter search or the entry word search operation in the English to Japanese translation mode. Among each of the dot matrices of 7 lower-digit symbols, a dot or dots in the top row and the bottom row are used to specify the English letters in the a–z indexes 7. The dots to be used for this purpose are illustrated in black in FIG. 2(1). The remaining dots are shown in white in FIG. 2(1). In FIGS. 2(2) and 2(3), the white dots are omitted.

FIG. 2(2) shows a case of the letter search operation in which "d" is displayed and selected. The selected letter "d" is displayed in the first digit. The dots for specifying the "a" to "d" in the letters a–z indexes 7 are all illuminated as indicated to be black. In this manner, a particular analog display is presented.

It may be possible that only the letter dot for specifying the "d" to be selected is illuminated. The number of the dots for specifying the letters in the a–z indexes 7 is not limited to one. A plurality of dots can be used to select a single letter.

FIG. 2(3) shows a case of the entry word search operation in which a word "desk" is selected. The first two digits of the selected word "desk" are displayed in the digits. The dots for specifying letters "a" to "e" (the second letter of the selected word "desk") in the a–z indexes 7 are illuminated to present a particular analog display indicating the entry word search operation.

It may be possible that only the dot for specifying the letter identical to the second alphabet of the selected word is illuminated in the analog display.

FIG. 3(1) shows the matrices of the dots used in displaying the letter search or the entry word search operation in the Japanese to English translation mode. Among each of the dot matrices of the latter 5-digit symbols, all the dots in the top row and the bottom row are used to specify the Japanese "katakanas" in the Japanese syllabary indexes 8. The used dots are black in FIGS. 3(1) to 3(3).

FIG. 3(2) shows a case of the letter search operation in which "ウ(u)" is displayed and selected. "ウ(u)" is alloted at the third row of the column starting with "ア(A)" in the Japanese syllabary. Therefore, three dots are illuminated in the region of "ア(A)".

FIG. 3(3) shows a case of the entry word search operation in which "ウデドケイ(u-de-do-ke-i)" is selected. The first four digits of the 9 digits are used to display at least part of the entry word selected. In this example, the second "katakana" of the selected Japanese entry word is a sonant by adding a sonant mark. One digit is consumed to display the sonant mark. Only three "katakanas" of the selected Japanese entry word are displayed in the upper four digits.

FIG. 4 shows the relationship between key switches actuated and the contents of the display 6, in which an English word "boat" is selected and then translated into Japanese.

FIG. 4-(1)

The letter forward search key 2 as referred to the key symbol "▶" is operated to display "a" in the first digit of the digits in the display 6 and illuminate a dot related to the letter "a" in the a–z indexes 7.

FIG. 4-(2)

The letter forward search key 2 is further operated to replace "a" with "b" in the first digit and illuminate another dot related to the letter "b" in the a–z indexes 7 in addition to the dot related to the letter "a".

FIG. 4-(3)

Entry words each starting with "b" are retrieved in response to the operation of the letter input and entry word forward search key 3 referred to the key symbol "↓". While this key 3 is being operated, the entry words each starting with "b" are subsequently developed in the English alphabetical order. The first two letters of each of the entry words are displayed. The analog display is enabled to indicate the instant entry word search operation as described above.

FIG. 4-(4)

The operation as described with reference to FIG. 4-(3) is repeated.

FIG. 4-(5)

When the first two letters equivalent to those of the entry word "boat" to be searched are displayed in the first two digits of the display 6, the operation of the entry word forward search key 3 is released.

FIG. 4-(6)

In response to the release of the operation of this key 3, a full word presently retrived is displayed in the display 6. In this instance, "body" is displayed.

FIG. 4-(7)

It is evident that the entry word "boat" is passed since the developed word "body" follows the word "boat" in the English alphabetical order. Hence, the entry word backward search key 4 referred to the key symbol "◀" is operated. Each time this key 4 is operated, another full word of each previous entry word is displayed in the display 6. Since the word "boat" is adjacent to the word "body", the key 4 is operated once to display the word "boat".

FIG. 4-(8)

The translation key 5 is operated to provide a translated Japanese form of the word "boat".

If a word previous to the entry word to be searched is displayed according to the operation of FIG. 4-(5), the entry word forward search key 3 is further actuated. Each time this key 3 is operated, the full word of a subsequent entry word is displayed. Until the full word of the entry word to be searched is displayed, the key 3 is being operated. When the entry word to be searched is displayed, the translation key 5 is operated for translation.

FIG. 5 shows a circuit implemented within the pocket electronic translator of FIG. 1.

The circuit of FIG. 5 comprises a microprocessor 11, a keyboard 12, a memory 13, a driver 14, and the display 6. An address bus 15 and a data bus 16 are provided.

The microprocessor 11 develops key strobe signals KS toward the keyboard 12 and receives key input signals KI from the keyboard 12 to detect the operations of the key switches in the keyboard 12. The keyboard 12 contains the key switches as shown in FIG. 1. The microprocessor 11 selects an address of the memory 13 to read in the contents of the address.

The microprocessor 11 comprises a ROM 17, a RAM 18, a controller 19 and an input/output buffer 20. An inner bus is provided to interconnect the ROM 17, the RAM 18, the controller 19 and the input/output buffer 20. The ROM 17 stores a control program. The RAM 18 provides registers and flags. The controller 19 serves to control calculation operations.

The memory 13 stores a great number of English words and Japanese words used for the translator mode. The driver 14 is responsive to display pattern information provided by the microprocessor 11 for controlling illumination of the dots in the display 6.

Figure 6:
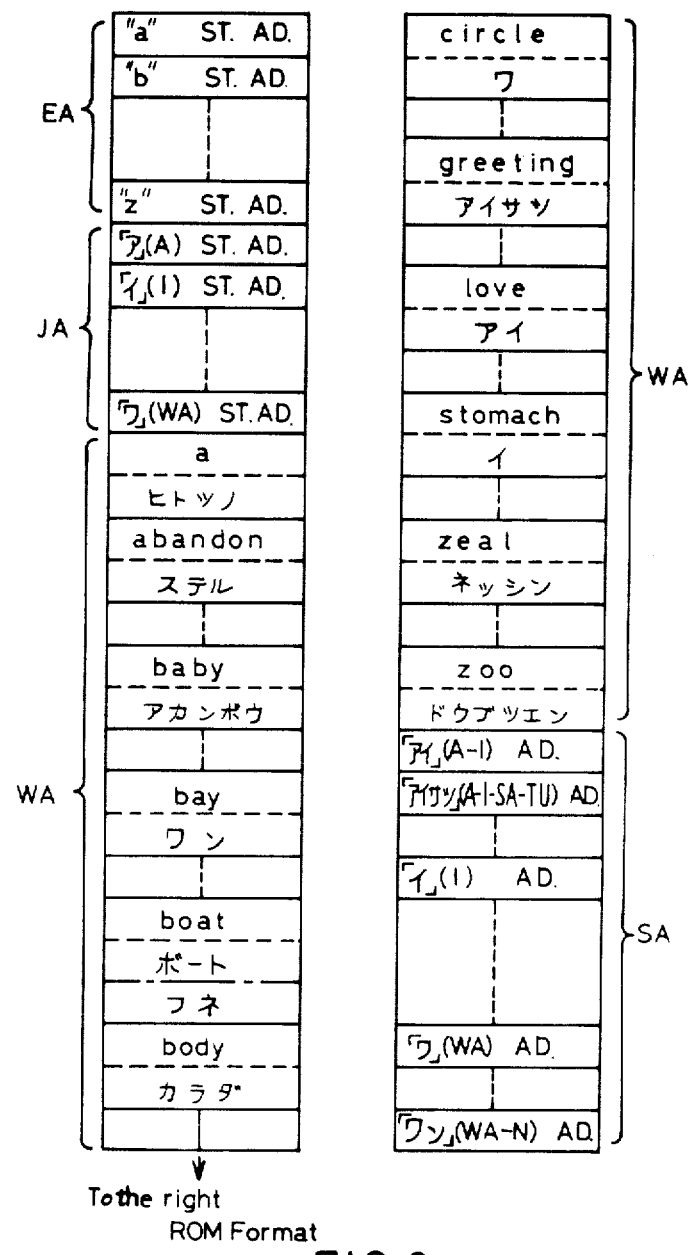
FIG. 6 shows the contents of a memory connected in the circuit of FIG. 5.

FIG. 6 shows the contents of the memory 13. The ROM format of the memory 13 includes a plurality of memory regions EA, JA, WA and SA.

The memory region WA is provided for storing the English words and the Japanese words. The English words are stored in the English alphabetical order. Each of the Japanese words follows each of the English words, said each of the Japanese words being equivalent to each of the English words in meaning. The memory region SA is provided for storing address information, referred to as "AD." in FIG. 6, to align the Japanese words stored in the memory region WA in the Japanese alphabetical order and its reverse order. The memory region SA stores the address information "AD." for each of the Japanese words in the order that the Japanese words are aligned in the Japanese alphabetical order.

The memory region EA is an English start address table for storing a number of start addresses for leading words of the English words starting with each of the letters "a" to "z", respectively. Each of the start addresses is represented by "ST. AD." in FIG. 6.

The memory region JA is a Japanese start address table for storing a number of start addresses "ST. AD." for leading words of the Japanese words starting with each of the respectively Japanese "katakanas".

Figure 7:
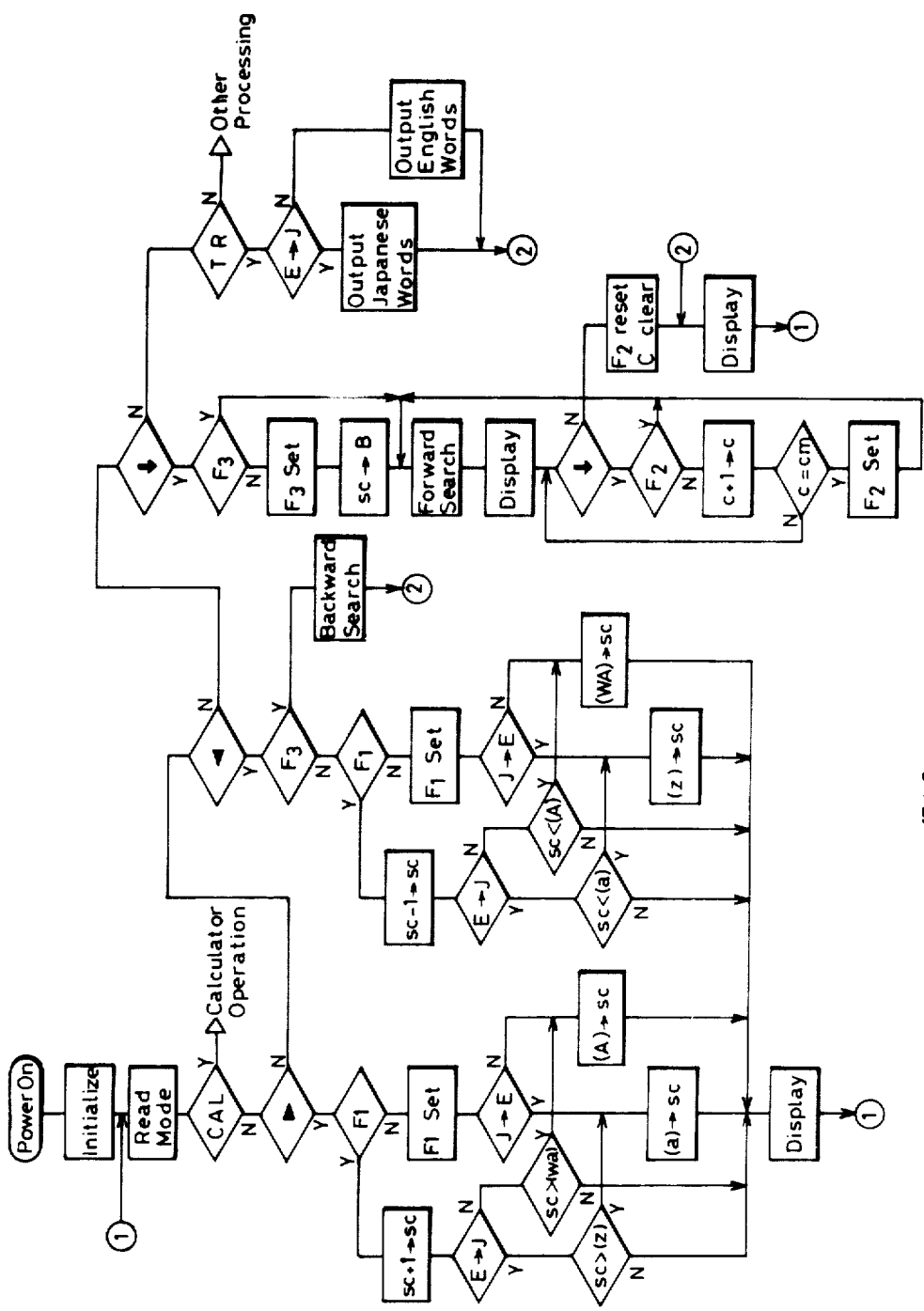
FIG. 7 shows a flow chart of the operations of a microprocessor provided in the circuit of FIG. 5.

FIG. 7 shows a flow chart of the operation of the microprocessor 11 of FIG. 5, as related to the present invention. The RAM 18 of the microprocessor 11 contains three flags $F_1$, $F_2$ and $F_3$, an alphabet code buffer SC, a buffer B, and a counter C. The symbols corresponding to these elements $F_1$ to $F_3$, SC, B and C are shown in the flow chart of FIG. 7.

The flag $F_1$ is set to indicate that the letter forward search key 2 "►" or the letter backward search and entry word backward search key 4 "◄" has been actuated. The flag $F_2$ is set to indicate that the letter input and entry word forward search key 3 "↓" is being operated for a predetermined time. The flag $F_3$ is set to indicate that the letter input and entry word forward search key 3 is operated. The alphabet code buffer SC is provided for buffering alphabet codes.

In this preferred embodiment, the letters correspond to the alphabet codes as follows:

| English alphabets | alphabet codes |
|---|---|
| a | 01 |
| b | 02 |
| z | 26 |
| Japanese "katakanas" | codes |
| (A) | 27 |
| (I) | 28 |
| (WA) | 70 |

With reference to FIG. 7, the steps of the flow chart are executed as follows. After the is turned on power, the flags $F_1$ to $F_3$, the buffers B and SC, and the counter C are initialized. The selected mode of the mode selector 1 is read in. Unless the calculator mode is selected, the translator mode is selected to execute routines for the translator.

When the letter forward search key 2 "►" is operated, the flag $F_1$ is set. When the English to Japanese translation mode is selected, the letter code for the alphabet "a" is inputted into the alphabet code buffer SC. The alphabet code for the letter "a" is represented as (a). When the Japanese to English translation mode is selected, the "katakana" code (A) for the "katakana" "ア" is inputted into the alphabet code buffer SC. Based upon the contents of the buffer SC, the English or Japanese letters are displayed together with the analog display indicating the letter search operation as related to FIG. 4-(1).

The letter forward search key 2 is further operated to progressively change the contents of the alphabet code buffer SC. Based upon the contents of the buffer SC, the English or Japanese letters are displayed together with the analog display as related to FIG. 4-(2).

When the buffer SC contains information over the alphabet code (Z) for "Z" or the "katakana" code (WA) for "ワ", which is the last letter, the alphabet code (a) for "a" or the "katakana" code (A) for "ア" is introduced into the buffer SC for replacement of the alphabet code upon further actuation of key 2.

When the letter backward search key 4 is operated, the letters are searched in the reverse direction.

The letters to be selected are retrieved by operating the letter forward search key 2 or the letter backward search key 4. Then, the letter input and entry word forward search key 3 is operated to set the flag $F_3$. Thereafter, the letters are inputted by inputting the alphabet codes stored in the buffer SC into the buffer B. The leading words of the English words or the Japanese words starting with the input letters are retrieved. The first two English alphabets in the English word retrieved or the upper four Japanese "katakanas" in the Japanese word retrieved are displayed. The related analog display is also enabled to show the entry word search operation. These steps are related to FIG. 4-(3).

The operation of the letter input and entry word forward search key 3 is continued. When the contents of the counter C become equivalent to a predetermined value Cm, the flag $F_2$ is set. The following English words are developed in the English alphabetical order, or otherwise, the following Japanese words are developed in the Japanese alphabetical order. The first two English letters or the first four Japanese "katakanas" are displayed together with the analog display for the entry word search operation. These steps are related to FIG. 4-(4).

When the letters to be retrieved are displayed, the operation of the letter input and entry word forward search key 3 is released. The flag $F_2$ is reset and the counter C is cleared. All letters of the entry word presently developed are displayed. These steps are related to FIG. 4-(5) and 4-(6).

When the overrun of an search operation is detected, the entry word backward search key 4 "◄" is operated. Each time this key 4 is operated, each of the previous entry words is developed so that all letters thereof are displayed. On the other hand, when a too-short search operation is detected, the entry word forward search key 3 is further operated.

Each time the key 3 is operated, each of the following entry words is developed so that all the letters thereof are displayed. These steps are related to FIG. 4-(7).

When the entry word to be retrieved is displayed, the translation key 5 is operated to enable translation. These steps are related to FIG. 4-(8).

The number of the letter selected by the letter forward search key 2 for the entry word search operation is not limited to one although, in the above description, a single letter is used for this purpose. Two or more letters can be selected by the search key for the entry word search operation.

While only certain embodiments of the present invention have been described, it will be apparent to those skilled in the art that various changes and modifications may be made therein without departing from the spirit and scope of the invention as claimed.

What is claimed is:

1. Input and word retrieval means for enabling rapid input and retrieval of a first word represented in a first language, said means being adapted to an electronic translator for obtaining a second word represented in a second language, equivalent to the first work, in response to the input and retrieval of the first word, comprising:

specifying means for specifying at least one letter;

input means connected to said specifying means for inputting said at least one letter into the electronic translator;

the translator comprising memory means for memorizing a plurality of words in the first language containing the at least one letter;

access means connected to said input means and said memory means for addressing said memory means;

said access means being responsive to a first operation of said input means for retrieving from said memory means one or more partial words starting with said at least one letter;

the translator further comprising display means, connected to said memory means, for displaying said at least one partial word;

said specifying means comprising means, upon further operation after said first operation of said input means, for retrieving from said memory means one or more complete words starting with at least one said partial word in either an alphabetical order or a reverse alphabetical order in the first language;

said display means, receiving said partial word from said memory means, upon said operation of said specifying means.

2. The input and retrieval means of claim 1, wherein said specifying means comprises alphabet indices corresponding to letters of the first and second languages, a dot display portion for specifying a selected one of the alphabet indices and forward and backward search key means for changing the index indicated by said display portion.

3. The device of claim 2, wherein said memory means stores a plurality of words in the first language and corresponding words in the second language, said translator comprising translation means for retrieving from said memory means the second word corresponding to a displayed first word.

4. The device of claim 2, wherein the forward and backward search key means is operable for retrieving from said memory means a word following or preceding a displayed first word.

5. The input and retrieval means of claim 2, further comprising a microprocessor comprising:

first flag means for indicating that said forward or backward search key means has been operated;

second flag means for indicating that said first operation of said input means has continued and ceased after a predetermined time;

third flag means for indicating that the input means is actuated; and buffer means for storing codes representative of the first word in the first language or the second word in the second language.

6. The input and retrieval means of claim 1, wherein said access means is responsive to said first actuation of said input means for sequentially retrieving a plurality of partial words starting with said at least one letter.

7. The input and retrieval means of claim 6, wherein said access means sequentially retrieves said partial words throughout said first actuation of said input means, and ceases retrieval of said partial words when said first actuation ceases.

* * * * *